W. R. GREEN.
PROTECTIVE CASING FOR PNEUMATIC TIRES.
APPLICATION FILED APR. 24, 1911.
1,048,958.
Patented Dec. 31, 1912.
3 SHEETS—SHEET 1.
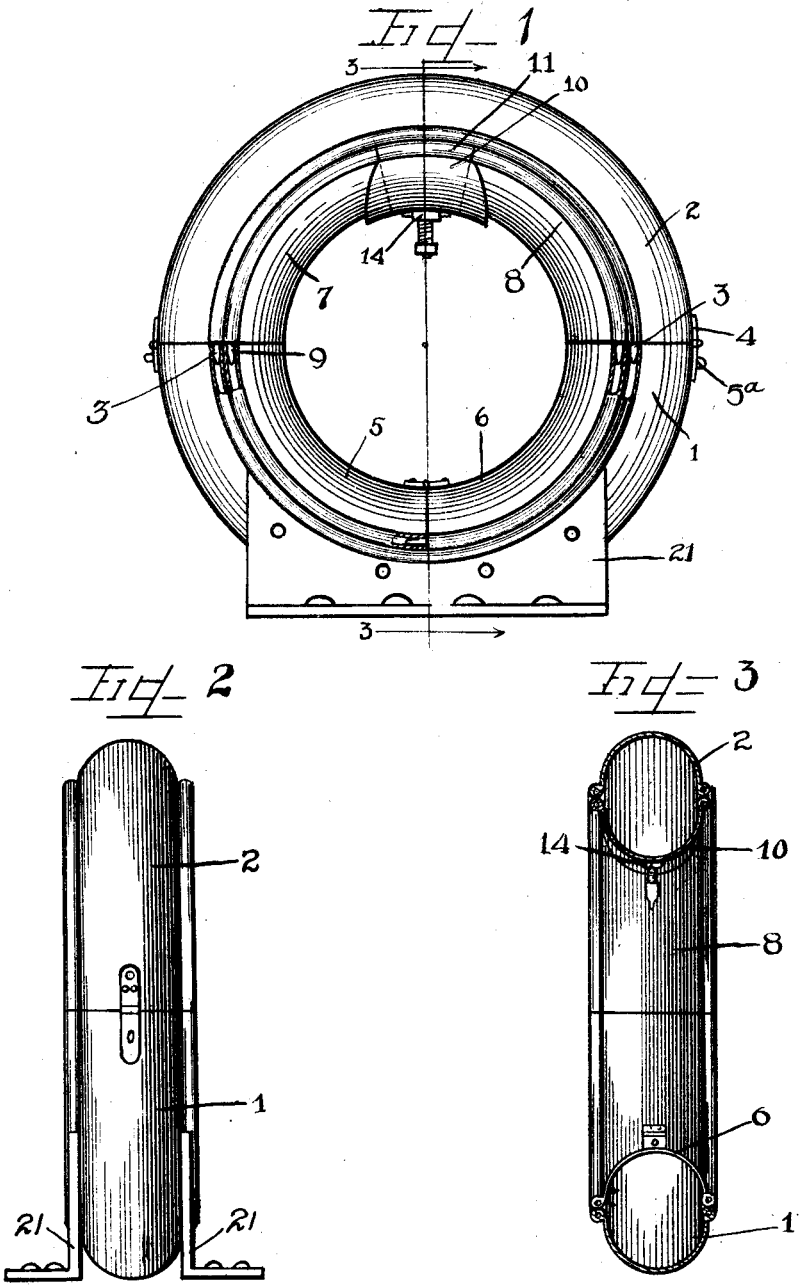

W. R. GREEN.
PROTECTIVE CASING FOR PNEUMATIC TIRES.
APPLICATION FILED APR. 24, 1911.
1,048,958.
Patented Dec. 31, 1912.
3 SHEETS—SHEET 2.
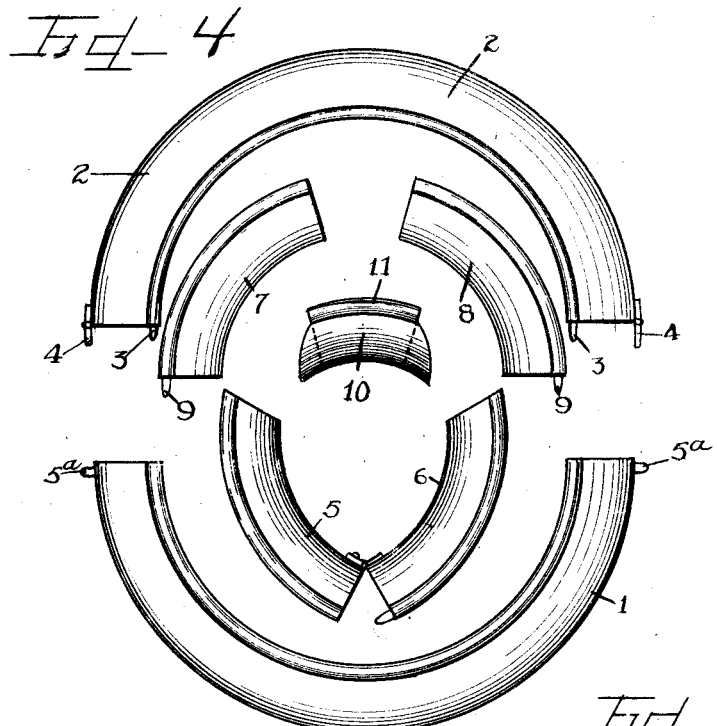
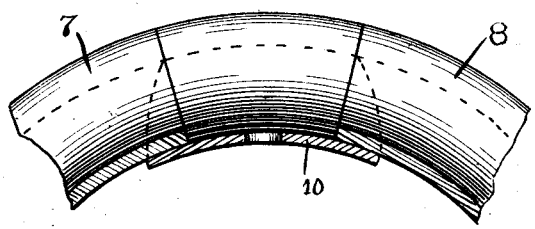
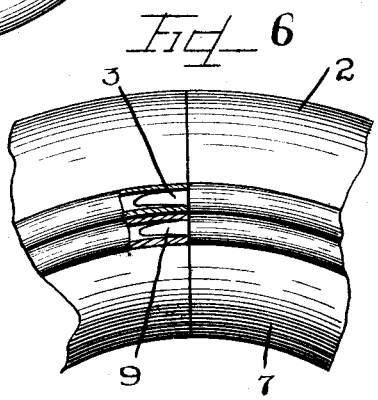
Witnesses
W. H. Cowen
Charles W. Hills Jr.
Inventor
Walter R. Green.
Charles W. Hills, Atty.

W. R. GREEN.
PROTECTIVE CASING FOR PNEUMATIC TIRES.
APPLICATION FILED APR. 24, 1911.
1,048,958.
Patented Dec. 31, 1912.
3 SHEETS—SHEET 3.
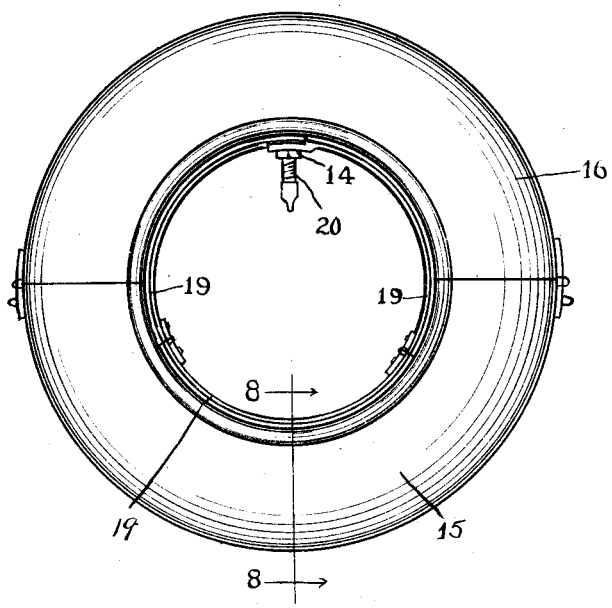
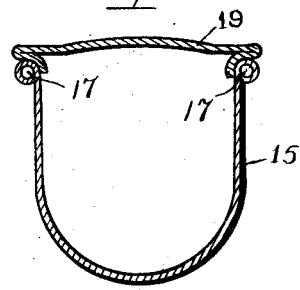

UNITED STATES PATENT OFFICE.

WALTER R. GREEN, OF CHICAGO, ILLINOIS.

PROTECTIVE CASING FOR PNEUMATIC TIRES.

1,048,958.  Specification of Letters Patent.  Patented Dec. 31, 1912.

Application filed April 24, 1911. Serial No. 622,982.

*To all whom it may concern:*

Be it known that I, WALTER R. GREEN, a citizen of the United States, and a resident of the city of Chicago, in the county of Cook and State of Illinois, have invented certain new and useful Improvements in Protective Casings for Pneumatic Tires; and I do hereby declare that the following is a full, clear, and exact description of the same, reference being had to the accompanying drawings, and to the numbers of reference marked thereon, which form a part of this specification.

With the extensive introduction into use of pneumatic tires, a means for carrying and at the same time protecting extra tires, has been in demand. Various types of protective carriers have been constructed but the protective and preservation features have not been so strongly recognized.

The object of this invention is to afford a tire protecting casing, which contains and supports the tire casing at all times when not in use and which is practically dust and weather proof at all times.

The invention consists in the matters hereinafter described and more fully pointed out and defined in the appended claims.

In the drawings: Figure 1 is a side elevation of a tire casing embodying my invention. Fig. 2 is an edge view thereof. Fig. 3 is a section on line 3—3 of Fig. 1. Fig. 4 is a side elevation showing the parts disassembled and the tire casing removed. Fig. 5 is a longitudinal section. Fig. 6 is a fragmentary detail partly in section showing a part of the casing in side elevation. Fig. 7 is a side elevation of a tire casing embodying my invention, of a slightly modified construction. Fig. 8 is an enlarged, transverse section thereof on line 8—8 of Fig. 7.

As shown in the drawings: Referring first to Figs. 1 to 6 inclusive, a sheet of thin and relatively light metal is stamped or pressed to afford a semi-circular and concave base portion 1, of the casing, the inner conformation of which adapts the same to fit very closely to the casing when secured in place. 2, indicates a corresponding casing adapted to be placed on the base section 1, and provided with dowels 3, at its ends, which fit into the notches or recesses therefor in the upturned ends of the casing 1. The upper casing section 2, is provided at its ends with apertured latches 4, adapted to engage a suitable aperture in a plate 5ª, one of which is secured on each end of the lower casing. The tire is inserted in place, of course, ordinarily before the upper casing section 2 is secured in place, and said tire having been secured in position as described, the inner casing sections 5 and 6, are inserted thereover in the casing section 1. For this purpose, as shown, said casing sections 5 and 6, are hinged together on the inner side and one of the same is provided in its end adjacent the hinge with dowels and the other with recesses to receive the dowels to very firmly lock the same in register. Corresponding half section members 7 and 8, of slightly less length than the casing sections 5 and 6, are next secured in place, the dowels 9, thereon fitting into complemental recesses therefor in the upper ends of the sections 5 and 6. This closes the casing with the exception of the small space at the air valve, and to close the same a short section 10, provided with apertures to receive the air valve therethrough, is secured in position and the bead 11, thereof fits between the marginal beads at the adjacent ends of the sections 7 and 8. Of course, said short casing section 10, is firmly held in place by means of a nut 14, which is threaded onto the end of the air valve as usual and acts to support said section 10, thereby supporting the interior covering for the tire casing in place.

In the construction illustrated in Figs. 7 and 8, the lower casing member 15, is connected with the upper casing member 16, as before described, or one or the other of the ends of said sections may be connected by means of a hinge. A plate of metal 19 is bent at its edges to afford an inwardly directed flange, which fits within the lateral beads 17. Said plate 19, is constructed in three sections, of which the lower is hingedly connected at its ends with the two upper sections, and the ends of said sections overlap, as shown in Fig. 7, to permit an air valve stem 20, to be inserted therethrough to hold the same in place and a nut 14, is engaged on said air valve stem as before described, to hold said ends of said sections firmly in adjusted position.

As shown in Fig. 1, the lower section 1, has rigidly secured thereto by riveting or otherwise a flanged bracket plate 21, adapted to be secured to the running board of the automobile or to any other part thereof and acting to support the casing which, of course, may also be otherwise secured in place upon the automobile if desired.

The operation is as follows: The operation is obvious from the foregoing description. When the tire casing is inclosed within its case, it is wholly protected from dirt and dust and from other injurious objects to which it is otherwise likely to be exposed. The inner casing sections fit closely within the upper periphery of the tire casing and afford a support therefor in part from the top, so that the weight of the tire casing is distributed in such a manner as to prevent deformation of the tire when the tire is not in use.

Of course, details of the application may be varied without departing from the principles of this invention and I therefore do not purpose limiting the patent to be granted on this application otherwise than necessitated by the prior art.

I claim as my invention:

1. A protecting casing for pneumatic tires embracing an outer sectional container shaped to fit to the tire, and inner sectional closing members adapted to fit within the periphery of the tire and to close on the outer container, said sections interfitting to firmly lock the same in place, one of said inner sections being apertured to receive the air valve stem of the inclosed tire therethrough, and a nut on the air valve stem acting to lock said sections in place.

2. A device of the class described embracing outer sectional end casing members of sheet metal, inner sectional sheet metal closing members having apertures therein and adapted to fit thereto and together therewith, to afford an annular chamber affording an outer supporting surface for the tread of the tire casing and an inner supporting surface for the inner periphery of the tire casing, and a nut engaged on the air valve stem of the inclosed tire at the said apertures to firmly lock some of said sections in place.

3. In a device of the class described a sheet metal housing or casing for pneumatic tires comprising a plurality of outer sections and a plurality of inner sections, said inner sections having apertures therein interfitting parts on the outer sections adapted to firmly engage the same together to fit to the tread of the tire, interfitting parts on the inner sections to fit to the inner periphery of the tire, and means for locking the inner sections together comprising a nut engaged over said apertures on the air valve stem of the tire within the casing.

4. A device of the class described embracing an outer sheet metal casing comprising upper and lower complemental sections and adapted to contain the tire therein, means locking said outer casing sections together, an inner casing section comprising a plurality of apertured segments shaped to fit into the outer tire casing and hingedly connected each to each, two of said sections overlapping at the air valve stem of the tire within the casing, and a nut secured on the air valve stem projecting through said aperture and acting to firmly engage the said inner sections.

5. In a protective device for pneumatic tires the combination, of an outer casing adapted to receive the same and to fit closely thereto, inner cover sections having apertures therein and fitted to the inner periphery of the tire within said outer sections and hingedly connected each to each, two of said sections overlapping at the air valve stem, and a nut secured on the air valve stem projecting through said aperture acting to rigidly lock the sections in adjusted position.

6. In a device of the class described, an outer outwardly curved casing comprising a plurality of sections, peripheral beaded edges thereon equally distant from the center of the device, complemental means adapted to secure the sections together, an inner casing comprising a plurality of inwardly curved sections, and means secured on said inner and outer sections to lock the same in position.

7. A protective carrier for tires comprising sectional inner and outer casings, hollow beads integral therewith and at an equal distance from the center of said carrier turned on the adjacent edges of the said casings, dowel pins secured in some of said sections adapted to fit in the beads of the other sections and afford a lock thereby.

8. A device of the class described consisting of segmental inner and outer casings, one segment of said inner casing having the ends thereof extended adapting the same to overlap the ends of the segments on either side thereof, and a bead turned on both edges of all the segments, affording continuous peripheral resilient contacts of a common diameter between the two casings in their normal position.

9. In a device of the class described a sectional outer casing, complemental locking means secured on said sections, an inner casing, and beads turned on said inner casing affording resilient contacts equidistant from the center of the device between the said casings.

10. A protective carrier of the class described comprising inner and outer members, said outer member comprising curved sections, parallel inwardly directed sides thereon, and beads on said inner member contacting said sides of the outer member.

In testimony whereof I have hereunto subscribed my name in the presence of two subscribing witnesses.

WALTER R. GREEN.

Witnesses:
CHARLES W. HILLS, Jr.,
LAWRENCE REIBSTEIN.